Figure 1:
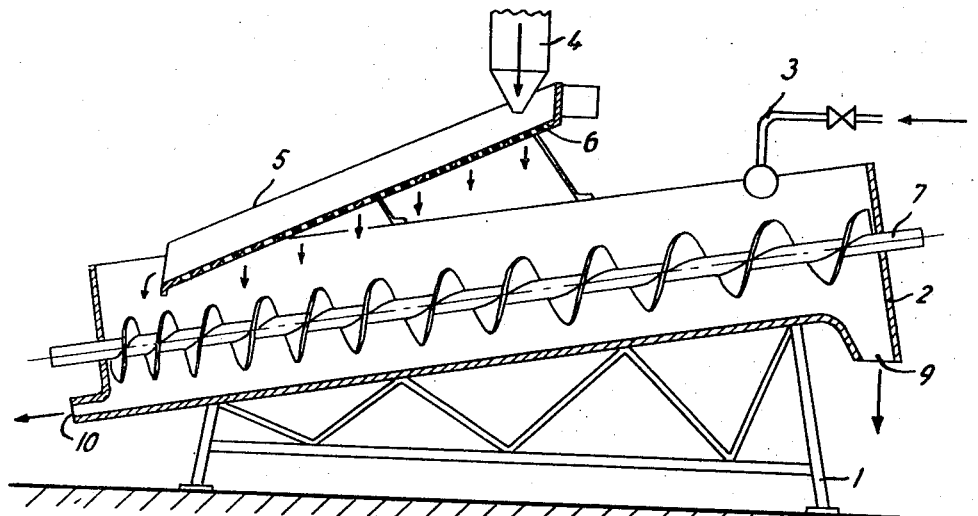

United States Patent [19]

Houghton-Larsen et al.

[11] 3,857,332

[45] Dec. 31, 1974

[54] APPARATUS FOR THE CONTINUOUS EXTRACTION IN COUNTERFLOW OF POWDERED MATERIALS

[75] Inventors: Erik Houghton-Larsen, Fredensborg; Ole Grønning Kjaergaard, Lyngby, both of Denmark

[73] Assignee: Aktieselskabet Niro Atomizer, Soborg, Denmark

[22] Filed: Oct. 30, 1972

[21] Appl. No.: 301,926

[30] Foreign Application Priority Data
Nov. 4, 1971   Denmark............................ 5410/71

[52] U.S. Cl.................................. 99/536, 426/432
[51] Int. Cl. ........................................... A47j 31/00
[58] Field of Search............ 99/535, 536; 259/6, 21, 259/41, 104, 165, 178; 426/425, 426, 432

[56] References Cited
UNITED STATES PATENTS
| | | | |
|---|---|---|---|
| 2,629,663 | 2/1953 | Fogler................................ | 426/432 |
| 2,949,364 | 8/1960 | Bilenker............................. | 426/432 |
| 2,991,870 | 7/1961 | Griffith.............................. | 259/104 |
| 1,374,657 | 4/1921 | Hiller................................. | 99/536 |

*Primary Examiner*—Harvey C. Hornsby
*Assistant Examiner*—Robert Pous
*Attorney, Agent, or Firm*—Sughrue, Rothwell, Mion, Zinn & Macpeak

[57] ABSTRACT

A method and an apparatus for the continuous extraction in counterflow of powdered material such as roasted and ground coffee-beans which is moved through an extraction vessel by means of a flowing liquid which is supplied to the extraction vessel at the one end of said vessel and is discharged from the vessel at the opposite end thereof. The powdered material to be extracted is supplied to the vessel in fractions, the fraction with the largest grain being supplied closest to the discharge of the extraction liquid so that the large grains have a long residence time in the extraction vessel, and the fractions of the powdered material having the smallest grain sizes being supplied closer to the inlet for the extraction liquid so that the small grains have a shorter residence time in the extraction vessel.

9 Claims, 3 Drawing Figures

APPARATUS FOR THE CONTINUOUS EXTRACTION IN COUNTERFLOW OF POWDERED MATERIALS

The invention relates to a method for the continuous extraction in counterflow of powdered materials, for instance roasted and ground coffee-beans, by means of a flowing liquid.

According to such a prior art method the powdered material is led through an inclined zone, at the upper end of which an inlet for the extraction liquid is provided, and at the lower end of which an outlet for the extraction liquid is provided, the powdered material being advanced through the zone in the direction from the extraction liquid outlet towards the extraction liquid inlet so that it is treated effectively with the extraction liquid which by the gravitational force is caused to flow against the direction of advance of the material, subsequently to which the extracted material leaves the zone at the end where the extraction liquid is supplied.

The powdered material to be extracted normally comprises different particle sizes, and this creates a problem since the extraction time is dependent upon the particle size, large particles requiring a longer extraction time than small particles in order that a certain output can be achieved. In the case of many products, experience shows, by way of example, that the extraction time is approximately proportional to the square of the mean particle size of the particles. The problem consists in the fact that in the case of the above-mentioned prior art method the powdered material to be extracted is to be supplied to the said extraction zone at such a distance from the extraction liquid inlet that the extraction time becomes suitable for the largest particles. The effect of this is, however, that the smaller and the very small particles are subjected to the extraction process for a longer period of time than is necessary or desirable and, in turn, this causes the volume of an apparatus intended for extracting a given quantity of material per unit of time to be dimensioned for the largest particle size, the said volume thereby becoming larger than necessary for the parts of the mass of material having a smaller particle size.

The method according to the invention is characterized in that the powdered material divided into fractions according to grain size is supplied at different points of the path of the flowing extraction liquid, so that the fraction containing the largest grain sizes is supplied closest to the outlet of the extraction liquid, and the fraction containing the smallest grain sizes is supplied closer to the inlet of the extraction liquid.

By the material to be extracted thus being supplied to different sections of the zone, through which the path of the extraction liquid extends, dependent on the grain size we achieve the following desirable result in a simple way: the small particles in the material get a shorter travel and consequently a shorter residence time in the extraction zone than the larger particles, and by this means the individual grains in the mass of material are subjected to the extraction process for the very optimum period of time for the particular grain sizes, and no longer. Thus an effective utilization of the volume of the extraction apparatus is achieved, and consequently it is possible to dimension the said volume so as to be smaller for a given quantity of material per unit of time than is the case in an apparatus operating according to the known methods of extraction. Another result of this is that with a given volume of apparatus it is possible to obtain a higher capacity when the method according to the invention is carried out than when the prior art method is carried out.

Furthermore, the method according to the invention renders it possible to adjust the apparatus to a uniform extraction, so that the yield becomes the same for large as well as for small particles. This is of particular importance when for example coffee is to be extracted, in which case the extraction process must not be carried too far out of regard to the flavour content, but must not be too slight either for economic reasons. In the case of the prior art method it is necessary to comprise between these two regards so that a reasonable yield from large particles is aimed at without the small particles adding too much undesirable flavour. This difficulty is not encountered when the method according to the invention is used, according to which the extraction process can be adjusted in such a way that the large particles are extracted exactly so much longer than the small particles that the yield becomes the same.

The invention also relates to an apparatus for carrying out the method stated above, which apparatus comprises an extraction vessel with an inlet for extraction liquid and an outlet for extract as well as transport members for powdered material in the direction from the outlet towards the inlet for the liquid.

Prior art apparatuses of this type, in which the material to be extracted is supplied to the extraction vessel in the vicinity of the outlet for the extract and where the extracted material is discharged from the extraction vessel in the vicinity of the inlet for the extraction liquid, can be constructed with adjustment means for the transport member for adjusting the speed of the latter according to a given powdered material to be treated in such a way that a suitable residence time is obtained for the largest grain sizes in the extraction zone and thereby a suitable extraction time for these grain sizes with the result, however, as mentioned above, that the smaller grain sizes which are present in the mass of material to be extracted and are supplied to the extraction zone together with the large grain sizes will be forced to stay unnecessarily or undesirably long in the extraction zone, so that the volume of the latter is not utilized to the optimum degree.

The apparatus according to the invention is characterized by a supply device for powdered material with at least two supply members located spaced from each other in the direction of transport of the transport members.

In such an apparatus, by a suitable dimensioning of the supply members the following desirable result is achieved: the smallest grain sizes in the material to be extracted are supplied through the supply member situated closest to the inlet of the extraction liquid, so that these grain sizes are subjected to the shortest period of treatment, while the larger grain sizes cannot pass through this supply member, but are supplied through the supply member or members located at a greater distance from the inlet of the extraction liquid, so that these larger grain sizes are subjected to a longer extraction treatment suited for them. Consequently it is possible to achieve that all the grain sizes in the material treated stay in the extraction zone only during the very periods of time suitable for treating the particular grain sizes with a high yield, and the volume of the extraction apparatus is thus utilized to the optimum degree, by which means the capacity of the apparatus is increased.

Figure 2:
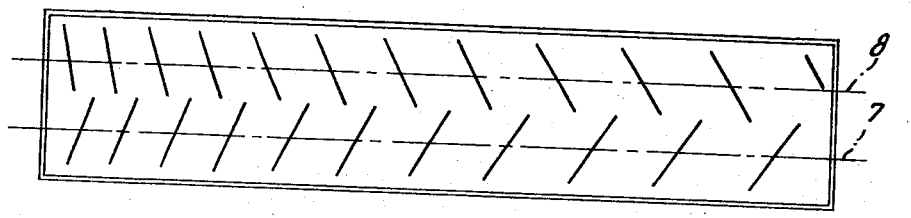
Figure 3:
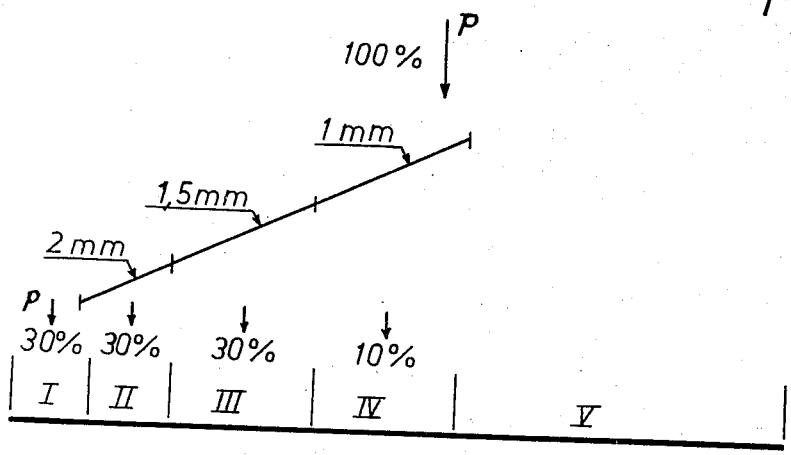

The invention is described below in greater detail on the basis of an embodiment of an apparatus according to the invention which is described with reference to the drawing in which FIG. 1 shows a section through an apparatus according to the invention, FIG. 2 shows a diagrammatical illustration in plan view of the transport members shown in FIG. 1, and FIG. 3 shows a diagrammatical illustration of the manner in which a powdered material is supplied to an extraction apparatus like that shown in FIG. 1 and is distributed over the extraction zone of this apparatus.

The extraction apparatus shown in FIG. 1, which during its function carries out the method according to the invention, comprises a supporting frame 1 which supports an elongated inclined vessel 2, the interior of which constitutes the extraction zone. To this zone, extraction liquid is supplied through a pipe 3, which liquid flows down through the extraction zone under the influence of the gravitational force.

The powdered material to be extracted, for instance roasted and ground coffee-beans, is supplied to the extraction zone from a hopper 4 which interacts with an inclined powder distribution member 5, the bottom part of which in the example shown is constructed as a screen 6 with mesh sizes that increase downwardly.

When, as shown, the powdered material is supplied from the hopper 4, the smallest powder grains will pass through the screen 6 immediately after having been supplied to the latter, since their grain size is smaller than the mesh size in this section of the screen 6. Larger powder grains cannot, however, pass through the screen 6 in this zone, and therefore they move, under the influence of the gravitational force, downwards over the screen with its increasing mesh size until they arrive at a section where the mesh size exceeds the grain size of the particular powder grains. Powder grains, if any, present in the material which have a grain size exceeding the largest mesh size in the screen 6 are in the embodiment shown discharged from the distribution member 5 via the lower edge of the latter, but, if it be desired, these large powder grains may of course also be collected at this end of the distribution member 5, e.g., by means of a tray, not shown.

When the powdered material thus distributed according to grain size has dropped into the extraction zone in the vessel 2, it is actuated by a transport member which is mounted in this zone and which in the example shown is constituted by two axis-parallel conveyor worms 7 and 8, see FIG. 2 in which these worms are shown diagrammatically. During their rotation, these worms will convey the powdered material supplied upwards against the flow of extraction liquid until the extracted material, in the present example coffee grounds, is discharged from the extraction zone through an outlet 9 within the section in which the extraction liquid is supplied. The extract obtained is drained off from an outlet 10 at the opposite end of the extraction zone.

As a consequence of the special way in which the powdered material is supplied to the extraction zone by means of the distribution member 5, the smallest grain sizes will thus be supplied comparitively closely to the section of the zone to which the extraction liquid is supplied and from which the extracted material is discharged from this zone, so that these small grain sizes are only subjected to an extraction treatment of a short duration suited for them, whereas the larger powder grains are not supplied to the extraction zone until they arrive at a point farther down the distribution member where the mesh size of the screen 6 is larger, so that these larger powder grains are subjected to a correspondingly more protracted treatment.

FIG. 3 shows diagrammatically how an extraction vessel divided into five sections I, II, II, IV and V interacts with a screen with three different mesh sizes which in the example shown are 1.0 mm, 1.5 mm and 2.0 mm. The section V of the extraction vessel is, as will be seen, the smallest extraction zone to be passed by any powder grain, and the very smallest powder grains are treated only in this section plus a greater or smaller part of section IV, the said smallest powder grains of a grain size less than 1.0 mm being supplied in this section. In the example shown, this amounts to 10 percent of the total quantity of material of 100 percent supplied at the arrow P. In the example shown, 30 percent of the material has a grain size of up to 1.5 mm and is supplied in section III, 30 percent has a grain size of up to 2.0 mm and is supplied in section II, while the remaining 30 percent has a still larger grain size. Consequently, the latter 30 percent of the material cannot pass through the meshes of the screen and is not supplied to the extraction vessel until it has passed beyond the range of the screen, this fraction of the material spilling over the end edge of the screen as shown by the arrow P. As mentioned above, this coarse-grained fraction of the material may also, if it be desired, be collected, e.g. by means of a tray placed at the arrow P, so that the coarse material is not supplied to the extraction vessel until it has been subjected to a further grinding process.

In many cases it is expedient if the individual fractions of particle-shaped material are supplied to sections I, II, III, IV or V that are so located in the extraction zone that the extraction time for each fraction or group of grain sizes of the mass of material will be approximately proportional to the square of the mean grain size of the particles in the particular fraction. The extraction apparatus may also be so constructed that the fractions of the mass of material having a smaller particle size than the maximum grain size are extracted in periods of time larger than the square of the proportion between the maximum particle size in the particular fraction and the maximum particle size in the whole mass of material, since hereby it can be achieved that every single particle is extracted to at least the same yield as the largest particles in the mass of material.

To promote the uniformity of the degree of filling of the vessel 2, it may be expedient to construct at least one of the conveyor worms 7 or 8 in such a way that its helical surface has an increasing pitch within the range in which the powdered material is supplied, as illustrated in FIG. 1 and in FIG. 2 which show both helical surfaces with variable pitch, but where the design might also have been so that one helical surface has a constant pitch and the other helical surface a variable pitch. By this means, an increasing speed of advance of the extraction material in the extraction vessel 2 in conformity with the increasing quantity of material is achieved in a simple way.

The uniform degree of filling of the vessel 2 renders possible a maximum utilization of the volume of the vessel and thereby a maximum capacity for the whole extraction apparatus.

The method and the apparatus according to the present invention also render possible the obtainment of an extract with higher solids contents than is possible with prior art methods and apparatuses.

This is due to the fact that increased solids contents involve an increased viscosity of the extract, particularly in the vicinity of the discharge of the extract where the extract is most concentrated and the solids contents consequently are greatest. The fact is that the specific flow resistance of the extracted material in this part of the extraction vessel, which is the same as the specific flow resitance in the remaining part of the container in the case of the prior art technique, determines how great the viscosity and thereby the solids contents may be without the flow of liquid through the material being impeded inadmissibly.

In the case of the method and the apparatus according to the invention the specific flow resistance of the extracted material has, however, its minimum value within the said range at the discharge of the extract since the largest particles only are present within this range, and the result of this is that a higher viscosity and thereby a higher solids contents can be permitted before the flow of the extraction liquid is impeded inadmissibly.

In order to throw further light on the advantages that can be gained due to the invention a practical test has been carried out in which roasted and ground coffee-beans with the following particle distribution were extracted:

30 percent particles with a particle size larger than 2.0 mm 60 percent particles with a particle size larger than 1.5 mm 90 percent particles with a particle size larger than 1.0 mm.

For the extraction process an extraction vessel was used of the Niro Atomizer make of a known type with two parallel conveyor worms, each of which had a diameter of 550 mm and a pitch of 400 mm. The distance between centres was 410 mm. The length of the conveyor worms, that is to say the length of the extraction zone in the horizontal direction, was 6 m. The quantity of material extracted was 750 kg coffee per hour, and from this 885 kg extract was obtained per hour with a solids contents of 17 percent. The residence time of the material in the vessel and hence the extraction time was 50 minutes.

The extraction apparatus was subsequently rebuilt in conformity with the principles stated by the invention, so that it was provided with a screen as shown by 5 in FIG. 1 with the mesh sizes 1.0 mm, 1.5 mm and 2.0 mm, and the conveyor worms mentioned above were substituted by other conveyor worms with data as listed in the table shown below which refers to an arrangement as that shown in FIG. 3.

After the vessel had been rebuilt there was, under otherwise unchanged conditions, produced an extract with the same yield as before and with the same solids contents, but the capacity of the vessel was now increased from the 750 kg roasted and ground coffee-beans per hour mentioned above to 1070 kg per hour corresponding to the average residence time of the material in the vessel having been reduced from 50 minutes to 35 minutes.

Above, the method and the apparatus according to the invention are described in connection with an embodiment where coffee is extracted, but the invention is not limited to being used in connection with coffee. It is equally well applicable in connection with other materials which may not follow a certain law, e.g. the law of the square of the proportion of particle size in relation to extraction time mentioned. Taking it by and large, it is applicable for the treatment of products which have a suitable particle form or can be made to assume such a form, e.g., for the purification of yeast such as *candida lipolytica* or *candida tropicalis* or fungi such as *pencillium notatum*.

In the embodiment of the extraction apparatus shown in the drawing and explained above the powder distribution member is constructed with a stationary screen, but in certain cases it is more expedient if a vibrating screen is used, and it will be appreciated that such an alteration may be performed without the principle of the method and the apparatus according to the invention being altered.

What we claim is:

1. An apparatus for extraction in counterflow of powdered material, e.g., roasted and ground coffee-beans by means of a flowing liquid said apparatus comprising an extraction vessel with an inlet for the extraction liquid, and an outlet for extract as well as transport members for powdered material in the direction from the outlet for the extract towards the inlet for the extraction liquid, characterized by a supply means for powdered material comprising at least two supply members located spaced from each other in the direction of transport of the transport members, the supply member supplying the smallest grains being placed closest to the inlet for the extraction liquid such that the larger grains are in contact with the extraction liquid a longer period of time than the smaller grains.

2. An apparatus as claimed in claim 1, characterized in that the supply means comprises a screen with a number of sections with mesh sizes differing from each other.

3. An apparatus as claimed in claim 1, characterized in that the transport members comprise two conveyor worms with parallel axes and with helical surfaces running in opposite directions.

4. An apparatus as claimed in claim 3, characterized

TABLE

| Vessel section: | Length of section: | Quantity of material supplied: | Particle size | Average pitch of conveyor worm: | Residence time in the vessel: |
|---|---|---|---|---|---|
| I | 50 cm | 30% | 2.0 mm | 133 mm | 50 min. |
| II | 50 cm | 30% | 1.5–2.0 mm | 180 mm | 41 min. |
| III | 100 cm | 30% | 1.0–1.5 mm | 300 mm | 32 min. |
| IV | 100 cm | 10% | 0.0–1.0 mm | 380 mm | 24 min. |
| V | 300 cm | 0% | — | 400 mm | — |
| Total | 600 cm | 100% | | | | in that the helical surface of at least one conveyor worm has an increasing pitch within the range in which the powdered material is supplied.

5. In apparatus for extracting coffee extract from roasted and ground coffee beans by means of a counter-flowing liquid, said apparatus comprising:
 a. an extraction vessel having an inlet for the extraction liquid, and an outlet for the coffee extract and
 b. means for transporting said roasted and ground coffee beans within said extraction vessel in the direction from the outlet for the extract towards the inlet for extraction liquid
the improvement comprising means for supplying relatively larger roasted and ground coffee beans to the interior of said extraction vessel closer to the outlet for the coffee extract and relatively smaller roasted and ground coffee-beans closer to the inlet for the extract and liquid, such that the residence time of the roasted and ground coffee-beans in said extraction vessel during use is longer for the relatively large beans and shorter for the relatively small beans.

6. Apparatus as claimed in claim 5 wherein said means for supplying relatively larger roasted and ground coffee-beans to the interior of said extraction vessel closer to the outlet for the coffee extract and relatively smaller roasted and ground coffee-beans closer to the inlet for the extraction liquid comprises a screen with a plurality of sections with graded mesh sizes.

7. Apparatus as claimed in claim 5 wherein said means for transporting the roasted and ground coffee-beans within said extraction vessel comprises two conveyor worms with parallel axes and with helical surfaces running in opposite directions.

8. Apparatus as claimed in claim 7 wherein the helical surface of at least one of said conveyor worms has an increasing pitch within the range in which the roasted and ground coffee-beans are supplied.

9. Apparatus as claimed in claim 5 wherein said means for transporting said roasted and ground coffee-beans within said extraction vessel comprises a conveyor worm with a helical surface the pitch of which increases within the range in which the roasted and ground coffee-beans are supplied.

* * * * *